(12) United States Patent
Dazin et al.

(10) Patent No.: US 9,835,711 B2
(45) Date of Patent: Dec. 5, 2017

(54) DEVICE AND METHOD FOR POSITIONING A STAR TRACKER ON A STRUCTURE

(71) Applicant: THALES, Courbevoie (FR)

(72) Inventors: Sébastien Dazin, Mandelieu (FR); Fabio Di Giorgio, Rome (IT); Damien Forestier, Pegonas (FR)

(73) Assignee: THALES, Courbevoie (FR)

( * ) Notice: Subject to any disclaimer, the term of this patent is extended or adjusted under 35 U.S.C. 154(b) by 255 days.

(21) Appl. No.: 14/874,635

(22) Filed: Oct. 5, 2015

(65) Prior Publication Data

US 2016/0097834 A1    Apr. 7, 2016

(30) Foreign Application Priority Data

Oct. 3, 2014   (FR) ..................... 14 02241

(51) Int. Cl.

| | |
|---|---|
| *G01C 21/02* | (2006.01) |
| *G01S 3/781* | (2006.01) |
| *B64G 1/36* | (2006.01) |
| *G01C 21/24* | (2006.01) |
| *G01D 5/26* | (2006.01) |

(52) U.S. Cl.
CPC ............ *G01S 3/781* (2013.01); *B64G 1/361* (2013.01); *G01C 21/025* (2013.01); *G01C 21/24* (2013.01); *G01D 5/26* (2013.01)

(58) Field of Classification Search
CPC ...... B64G 1/361; G01C 21/025; G01S 3/7867
USPC ........................................... 250/203.3, 203.1
See application file for complete search history.

(56) References Cited

U.S. PATENT DOCUMENTS

2013/0013199 A1*   1/2013   You ....................... G01C 21/24
                                                              701/513

FOREIGN PATENT DOCUMENTS

FR        2 816 406 A1     5/2002

OTHER PUBLICATIONS

Airbus: "A powerful planetarium to stimulate star sensors," Jan. 1, 2014, XP055197867 <http://www.space-airbusds.com/media/document/datasheet_stos_2014-06.doc>.

* cited by examiner

*Primary Examiner* — Thanh Luu
(74) *Attorney, Agent, or Firm* — Baker & Hostetler LLP

(57) ABSTRACT

A device for positioning a functional trihedron of a star tracker in a reference trihedron tied to a structure on which the star tracker is mounted comprises: a fixing interface to connect the device to the star tracker, a set of geometric markers configured to, by means of an optical measurement instrument tied to the structure, position a marker tied to the device in the reference marker tied to the structure, an optical simulator comprising a set of optical markers to be measured by the star tracker, making it possible to position the functional trihedron of the star tracker in the trihedron tied to the device, the measurements of position of the functional trihedron in the trihedron tied to the device, and of position of the trihedron tied to the device in the reference trihedron, making it possible to position by calculation the functional trihedron in the reference trihedron.

14 Claims, 3 Drawing Sheets

DEVICE AND METHOD FOR POSITIONING A STAR TRACKER ON A STRUCTURE

CROSS-REFERENCE TO RELATED APPLICATION

This application claims priority to foreign French patent application No. FR 1402241, filed on Oct. 3, 2014, the disclosure of which is incorporated by reference in its entirety.

FIELD OF THE INVENTION

The invention relates to a device and a method for positioning the functional axes of a star tracker fixed on a structure, notably the structure of a spacecraft, notably of a satellite. The device and the method are implemented in a phase of assembly and testing of the spacecraft, notably of the satellite.

BACKGROUND

The positioning and the orientation of a spacecraft with respect to the earth and to space are essential parameters in the operation of the craft. In the case of a satellite, one seeks on the one hand to control the orbit of the satellite around the earth through the six orbital parameters (semi-major axis, eccentricity, inclination, argument of the ascending node, argument of the perigee and true anomaly). One also seeks to know or indeed stabilize the orientation of the satellite with respect to the earth and to space. Diverse techniques are implemented to quantify these orbital parameters and carry out the operations necessary to maintain the satellite in a sought-after zone and according to a desired orientation. Geostationary satellites stabilized in relation to three axes, oriented towards the earth to allow the operation of diverse instruments such as telecommunications systems, are for example known. Attitude and orbit control systems, generally dubbed by their acronym AOCS, require that the position and the orientation of the satellite be known with high precision. Accordingly, AOCS systems implement several technologies of trackers such as a star tracker, a sun tracker or else an earth tracker.

In a known manner, the star tracker comprises means of optical measurement (for example, a CCD sensor) making it possible to take images of the celestial canopy, and a unit for processing these images making it possible to position and orient a functional trihedron of the star tracker with respect to space. By analysing the star field imaged with the aid of an onboard star catalogue, the star tracker positions the axes of its functional trihedron in space. Knowing the position of the star tracker on the satellite, the AOCS system deduces the position and the orientation of the satellite in space.

The precision of the positioning of the satellite in space is essential to the operation of the satellite and to the progress of its mission. Any inaccuracy of alignment entails the addition of a constant bias in the pointing of the satellite. It is therefore essential to precisely position the functional trihedron of the star tracker in a reference trihedron tied to the satellite. FIG. 1 illustrates the principle of the operation of aligning the star tracker on the satellite according to the known prior art. A star tracker 10 is fixed on the structure 11 of a satellite. The star tracker comprises means of optical measurement and a processing unit making it possible to position the reference trihedron T1 of the star tracker with respect to a benchmark tied to the stars. The positioning operation consists in positioning the reference trihedron T1 of the star tracker 10 with respect to a trihedron T3 tied to the structure 11 of the satellite. Knowing the transfer function between the trihedrons T1 and T3, the AOCS system will be capable of determining the orientation of the satellite in space by means of the measurement of the orientation of the star tracker in space.

According to the known prior art, the positioning is performed in two steps. In a first step, the manufacturer of the star tracker positions the reference trihedron T1 with respect to a trihedron T2 tied to the star tracker, defined by a set of geometric markers 12. In a second step, carried out by the constructor of the satellite during a phase of assembly and testing of the satellite, generally dubbed by its acronym AIT for Assembly Integration and Testing, the star tracker is fixed on the structure of the satellite. The constructor of the satellite thereafter positions the trihedron T2 tied to the star tracker in the trihedron T3 by means of the geometric markers 12 measured by an optical measurement instrument 13 tied to the structure 11 of the satellite. The combination of the two measurements makes it possible to deduce the relation between the functional trihedron of the star tracker and the reference trihedron of the satellite serving as reference in the pointing of the satellite. This approach however suffers from limits that the present invention seeks to alleviate. In particular, this approach makes it necessary to combine two measurements carried out by two distinct industrial parties and at two distinct places, a source of inaccuracy and industrial cost overhead. This approach furthermore requires the manufacturer to implement on each star tracker a set of optical markers that are easily measurable subsequently by the constructor in the AIT phase. In addition to the cost related to the mounting of this set of optical markers, this requires the constructor to identify and communicate to the manufacturer of the star tracker the positions of the optical markers liable to be measured under AIT, without risk of interference or masking by other components of the satellite. The measurement of alignment under AIT by means of optical markers mounted directly on the apparatus also constitutes a source of inaccuracy, in the case where different tests are carried out on the tracker and the satellite between the two measurements, the measurement made by the manufacturer of the tracker and the measurement made under AIT by the constructor of the satellite. It therefore remains desirable to have a means for simply and precisely positioning the functional marker of a star tracker in a marker tied to the satellite structure on which the star tracker is mounted.

SUMMARY OF THE INVENTION

For this purpose, the subject of the invention is a device for positioning a functional trihedron of a star tracker in a reference trihedron tied to a structure on which the star tracker is mounted, the device comprising:

a fixing interface intended to connect the device to the star tracker, a set of geometric markers configured to make it possible, by means of an optical measurement instrument tied to the structure, to position a marker tied to the device in the reference marker tied to the structure, an optical simulator comprising a set of optical markers intended to be measured by the star tracker, making it possible to position the functional trihedron of the star tracker in the trihedron tied to the device, the measurements of position of the functional trihedron in the trihedron tied to the device, and of position of the trihedron tied to the device in the reference trihedron, making it possible to position by calculation the functional trihedron in the reference trihedron.

Advantageously, the device comprises a control unit configured to:

communicate with the star tracker in such a way as to trigger and recover a measurement of position of the functional trihedron of the star tracker in the trihedron tied to the device, communicate with the optical measurement instrument in such a way as to trigger and recover the measurement of position of the trihedron tied to the device in the reference trihedron, and determine by calculation the position of the functional trihedron in the reference trihedron.

Advantageously, the control unit is configured to trigger and recover several successive measurements of position, of the functional trihedron of the star tracker in the trihedron tied to the device, or of the trihedron tied to the device in the reference trihedron, and to determine a mean value thereof.

Advantageously, the set of optical markers of the optical simulator comprises a set of luminous signals measurable by the star tracker.

Advantageously, the set of luminous signals is configured in such a way as to reproduce an image of the celestial canopy, allowing the star tracker to position the functional trihedron of the star tracker in the trihedron tied to the device.

Advantageously, the geometric markers comprise at least one optical cube fixed on the device to allow a position measurement by theodolite.

Advantageously, the geometric markers comprise at least one target fixed on the device and configured to allow a position measurement by photogrammetry or videogrammetry.

Advantageously, the structure is the structure of a spacecraft.

The invention pertains notably to such a device, intended to position the functional trihedron of a star tracker in a reference trihedron tied to the structure of a satellite.

The invention also pertains to an apparatus comprising a star tracker and a positioning device having the characteristics described above.

The invention pertains finally to a method for positioning a functional trihedron of a star tracker in a reference trihedron tied to a structure on which the star tracker is mounted, by means of a device having the characteristics described above; the method comprising:

a step consisting in communicating with the star tracker in such a way as to trigger and recover a measurement of position of the functional trihedron of the star tracker in a trihedron tied to the device, a step consisting in communicating with the optical measurement instrument in such a way as to trigger and recover the measurement of position of the trihedron tied to the device in the reference trihedron, and a step consisting in determining by calculation the position of the functional trihedron in the reference trihedron.

Advantageously, the method comprises a step consisting in activating the optical simulator of the device, carried out before the step consisting in communicating with the star tracker.

Advantageously, the measurement of position of the functional trihedron of the star tracker in the trihedron tied to the device, or of the trihedron tied to the device in the reference trihedron, is repeated several times; the step of determining the position of the functional trihedron in the reference trihedron comprising a sub-step of calculating a mean of the position measurements.

Advantageously, the method comprises a prior step consisting in fixing the star tracker on the structure and/or fixing the device on the star tracker.

BRIEF DESCRIPTION OF THE DRAWINGS

The invention will be better understood and other advantages will become apparent on reading the detailed description of the embodiments given by way of example in the following figures.

For the sake of clarity, the same elements bear the same markers in the various figures.

DETAILED DESCRIPTION

The general idea of the present invention consists in positioning on the one hand the functional axes of the star tracker with respect to a geometric marker tied to the star tracker, and on the other hand this geometric marker with respect to the structure of the satellite, by way of an exterior device connected to the star tracker. The positioning device is intended to be fixed to the star tracker for the alignment measurement operation carried out by the constructor of the satellite during the AIT assembly phase. This new approach makes it possible to circumvent the measurement of alignment of the star tracker carried out beforehand by the manufacturer of the star tracker. The alignment operation is carried out entirely after assembly of the star tracker on the satellite and by a single industrial party.

The invention pertains at the same time to the device intended to be connected to the star tracker fixed on the structure of the satellite, and to the method of aligning the star tracker by means of the device. The device and the method are envisaged for the alignment of a star tracker on a satellite. This particular application is not limiting of the present invention. More generally, the device and the method are applicable in respect of the alignment of any type of optical tracker fixed on the structure of any type of spacecraft.

Figure 1:
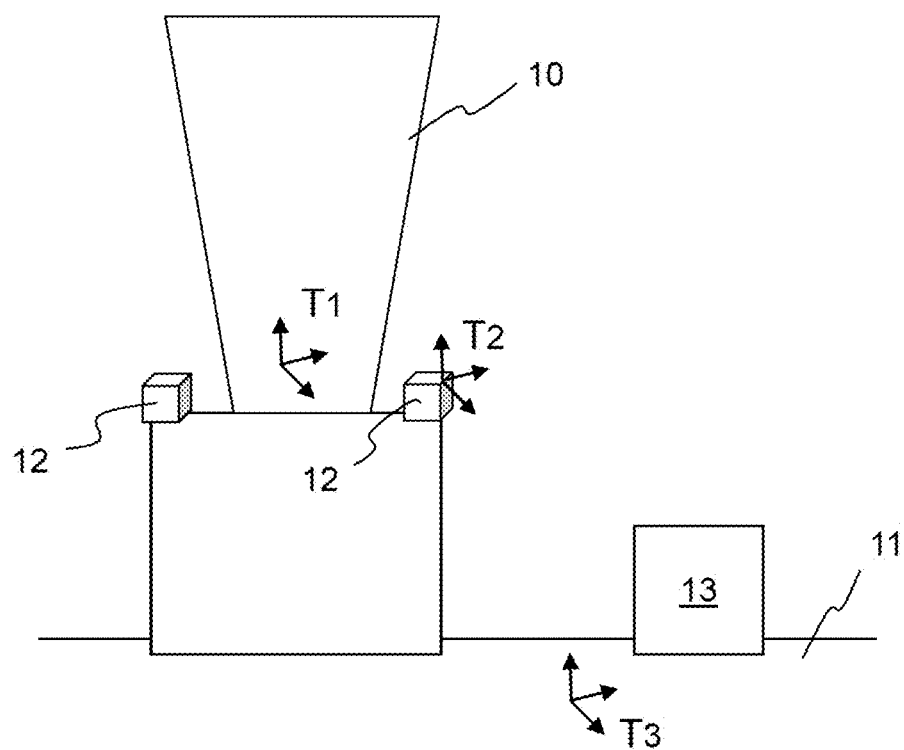
FIG. 1, already presented, represents a star tracker furnished with a set of optical references to position according to the known prior art a functional trihedron of the star tracker in a reference trihedron tied to a satellite to which the star tracker is fixed.
Figure 2:
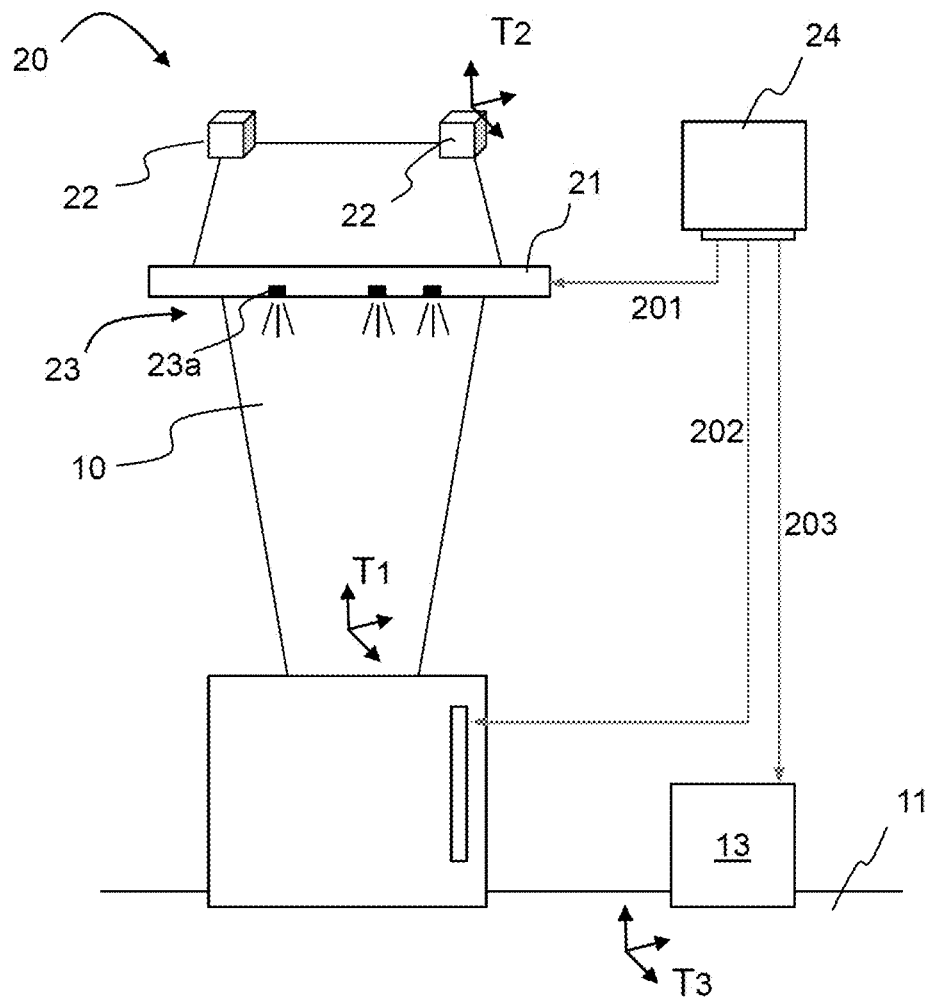
FIG. 2 represents a positioning device according to the invention connected to a star tracker fixed on a satellite making it possible to position the functional trihedron of the star tracker in the reference trihedron tied to the satellite.

FIG. 2 represents a star tracker 10 fixed on the structure 11 of a satellite. As described previously, the functional axes of the star tracker form a functional trihedron T1 that one seeks to position with respect to a reference trihedron T3 tied to the structure 11 of a satellite. The device 20 comprises:

a fixing interface 21 intended to connect the device 20 to the star tracker 10 in a temporary manner, a set of geometric markers 22 configured to make it possible, by means of an optical measurement instrument 13 tied to the structure 11 of the satellite, to position a marker T2 tied to the device in the reference marker T3 tied to the structure of the satellite, an optical simulator 23 comprising a set of optical markers 23a intended to be measured by the star tracker 10, in such a way as to allow the star tracker to position the functional trihedron T1 of the star tracker in the trihedron T2 tied to the device 20.

Thus, the combination of the measurements of position of the functional trihedron T1 in the trihedron T2 tied to the device (by means of the star tracker), and of position of the trihedron T2 tied to the device in the reference trihedron T3 (by means of the optical measurement instrument 13), makes it possible to position by calculation the functional trihedron T1 in the reference trihedron.

The fixing interface 21 can be embodied in any known way, to make it possible to mechanically tie the device and the star tracker during the alignment measurement operation. Diverse means of removable fixing can be envisaged.

Diverse techniques are envisaged for measuring the position of the device 20 with respect to the structure 11. For example, the geometric markers 22 can be optical cubes fixed on the device, whose alignment can be measured by an optical device such as a theodolite. Measurement by videogrammetry or photogrammetry is also envisaged; the geometric markers 22 comprising a target set whose position is measured by a photographic sensor tied to the structure of the satellite, or whose position in the reference trihedron T3 is known. Other techniques known to a person skilled in the art can further be envisaged without departing from the scope of the invention.

In a favoured embodiment of the invention, the optical simulator 23 is formed of a set of luminous points 23a configured to reproduce an image of the celestial canopy. Thus, the measurement by the star tracker of this image of the celestial canopy whose position with respect to the device is known makes it possible to position the functional trihedron T1 of the star tracker with respect to the device. Stated otherwise, the triggering of a customary measurement of the star tracker makes it possible to obtain the positioning of the functional trihedron T1 of the star tracker in the marker T2 tied to the device. In another embodiment, the optical simulator 23 is configured to reproduce a set of luminous points in such a way as to form a specific pattern that the star tracker is configured to recognize. The specific pattern, recognizable by the star tracker, can be formed of several luminous signals. More generally it comprises a set of optical markers measurable by the star tracker.

To summarize, the device according to the invention comprises on the one hand means of optical simulation, compatible with the star tracker, allowing the measurement of alignment of the device with respect to the functional axes of the star tracker by utilizing the data provided by the tracker, and on the other hand geometric markers allowing the measurement of alignment of the device with respect to an external reference; the position of the functional axes with respect to the geometric markers being known.

The use of this device for the alignment of the star tracker in the AIT phase by the constructor of the satellite is particularly advantageous. This makes it possible to circumvent the measurement of alignment of the star tracker on optical targets of the tracker, which is traditionally carried out by the manufacturer of the star tracker and for each tracker. This also makes it possible to circumvent the difficulties related to the visibility of the optical targets of the star tracker that are necessary for the positioning of the latter with respect to the satellite.

The device also comprises a control unit 24 intended for the command of the alignment operation. The control unit can be integrated at least partially into the device. It can also be implemented wholly or in part in a unit for overall control of a bench for measurement and testing of the satellite. It comprises a certain number of functions implemented in an electronic module, as well as a man machine interface allowing command of the functions and display of the results of the alignment measurement.

Advantageously, the control unit 24 comprises means for:

communicating with the star tracker 10 in such a way as to trigger and recover a measurement of position of the functional trihedron T1 of the star tracker in the trihedron tied to the device T2;

communicating with the optical measurement instrument 13 in such a way as to trigger and recover the measurement of position of the trihedron tied to the device T2 in the reference trihedron T3;

determining by calculation the position of the functional trihedron T1 in the reference trihedron T3.

In the favoured embodiment of the invention, the optical simulator is formed by a set of luminous signals intended to be measured by the star tracker. In this case, the control unit can also comprise means for activating and deactivating this set of luminous signals in such a way as to allow the measurement by the star tracker.

FIG. 2 represents functional links 201, 202 and 203 between the control unit and respectively the optical simulator (activation/deactivation of the optical simulator), the star tracker (triggering and recovery measurement of T1 in T2), and the optical measurement instrument (triggering and recovery measurement of T2 in T3).

The measurement of position of one trihedron with respect to another trihedron can take diverse mathematical forms. In the aeronautical sector, it is widespread to position the functional axes of a star tracker with respect to a benchmark by means of a quaternion. Thus, the measurement of the positioning of a first trihedron in a second trihedron can be expressed mathematically by the four values of the quaternion provided by the optical measurement instrument, positioning the first trihedron in the second trihedron. The position and orientation of one marker in another marker can be expressed by means of other mathematical formulations without departing from the scope of the invention, such as for example by means of the Euler angles or of a three by three matrix.

In the case where the alignment measurements are expressed by a quaternion, the final alignment calculation is obtained by combining the two previous measurements, by means of a relation of the type:

$$Q\_T_{1\text{-}3} = \text{transpose}(Q\_T_{1\text{-}2})^{}Q\__{disp}^{}Q\_T_{2\text{-}3}$$

in which $Q\_T_{1\text{-}3}$ is the quaternion of the functional trihedron of the star tracker in the reference trihedron of the satellite, $Q\_T_{1\text{-}2}$ is the quaternion provided by the star tracker, $Q\_T_{2\text{-}3}$ is the quaternion provided by the optical measurement instrument tied to the satellite, and $Q\__{disp}$ is the device's own quaternion quantifying the position of the optical simulator 23 with respect to the geometric markers 22.

The benefit of the device according to the invention is understood, making it possible to carry out at one and the same location, by a single industrial party, and substantially at the same moment, the two position measurements. The quaternion $Q\__{disp}$ quantifying the position of the optical simulator with respect to T2 being characterized just once for the device. Through the design of the optical simulator 23 and geometric markers 22, the device is configured to ensure great stability to this quaternion.

Note also that to increase the precision of the alignment operation, it is envisaged to configure the control unit in such a way as to trigger and recover several successive measurements of position, of the functional trihedron T1 of the star tracker in the trihedron tied to the device T2, or of the trihedron tied to the device T2 in the reference trihedron T3, and to determine a mean value thereof.

Figure 3:
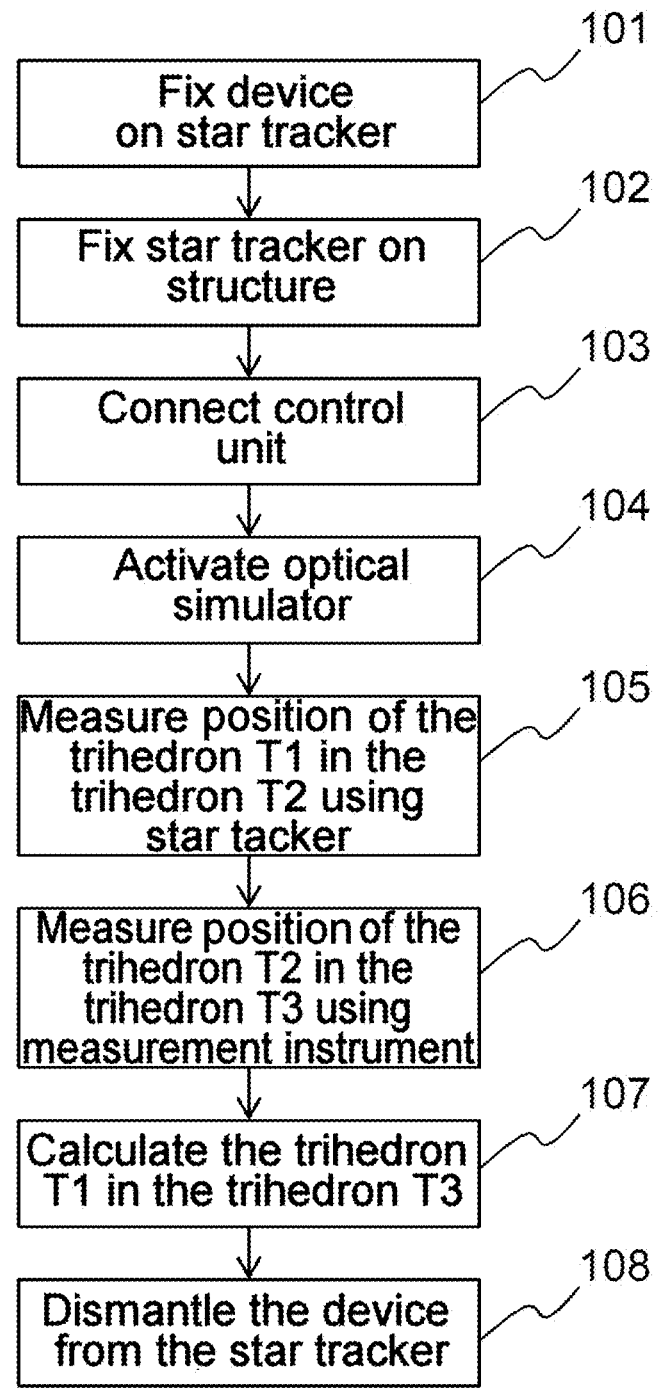
FIG. 3 represents the main steps of the method according to the invention for positioning the star tracker on the satellite.

FIG. 3 represents the main steps of the method according to the invention for positioning the star tracker on the satellite by means of a device such as described above.

The method of positioning comprises:

a step 101 consisting in fixing the star tracker 10 on the structure 11 of the satellite, a step 102 consisting in fixing the device 20 on the star tracker 10, step 102 being able optionally to be carried out before step 101 of fixing the star tracker on the structure, a step 103 consisting in connecting the control unit 24 of the device, notably with the optical simulator, the star tracker and the optical measurement instrument respectively by means of the links 201, 202 and 203, a step 104 consisting in activating the optical simulator 23, in such a way as to generate the set of luminous signals 23a measurable by the star tracker 10, a step 105 consisting in communicating with the star tracker 10 in such a way as to trigger and recover a measurement of position of the functional trihedron T1 of the star tracker in the trihedron T2, a step 106 consisting in communicating with the optical measurement instrument 13 in such a way as to trigger and recover the measurement of position of the trihedron T2 in the reference trihedron T3, a step 107 consisting in determining by calculation the position of the functional trihedron T1 in the reference trihedron T3, a step 108 consisting in unfastening and dismantling the device 20 from the star tracker 10.

Note that steps 105 and 106 consisting in triggering and recovering the measurements of position by the star tracker and the optical measurement instrument can be repeated several times. In this case, step 107 of determining the position of the functional trihedron T1 in the reference trihedron T3 advantageously comprises a step of calculating a mean of the position measurements.

The invention claimed is:

1. A device for positioning a functional trihedron of a star tracker in a reference trihedron tied to a structure on which the star tracker is mounted, the device comprising:
    a fixing interface intended to connect the device to the star tracker,
    a set of geometric markers configured, by an optical measurement instrument tied to the structure, to position a marker tied to the device in the reference marker tied to the structure,
    an optical simulator comprising a set of optical markers configured to be measured by the star tracker, to position the functional trihedron of the star tracker in the trihedron tied to the device,
    the measurements of position of the functional trihedron in the trihedron tied to the device, and of position of the trihedron tied to the device in the reference trihedron, making it possible to position by calculation the functional trihedron in the reference trihedron.

2. The device according to claim 1, comprising a control unit configured to:
    communicate with the star tracker in such a way as to trigger and recover a measurement of position of the functional trihedron of the star tracker in the trihedron tied to the device,
    communicate with the optical measurement instrument in such a way as to trigger and recover the measurement of position of the trihedron tied to the device in the reference trihedron;
    determine by calculation the position of the functional trihedron in the reference trihedron.

3. The device according to claim 2, whose control unit is configured to trigger and recover several successive measurements of position, of the functional trihedron of the star tracker in the trihedron tied to the device, or of the trihedron tied to the device in the reference trihedron, and to determine a mean value thereof.

4. The device according to claim 1, wherein the set of optical markers of the optical simulator comprises a set of luminous signals measurable by the star tracker.

5. The device according to claim 4, wherein the set of luminous signals is configured in such a way as to reproduce an image of the celestial canopy, allowing the star tracker to position the functional trihedron of the star tracker in the trihedron tied to the device.

6. The device according to claim 1, wherein the geometric markers comprise at least one optical cube fixed on the device to allow a position measurement by theodolite.

7. The device according to claim 1, wherein the geometric markers comprise at least one target fixed on the device and configured to allow a position measurement by photogrammetry or videogrammetry.

8. The device according to claim 1, wherein the structure is the structure of a spacecraft.

9. The device according to the claim 8, configured to position the functional trihedron of a star tracker in a reference trihedron tied to the structure of a satellite.

10. An apparatus comprising a star tracker and a positioning device according to claim 1.

11. A method for positioning a functional trihedron of a star tracker in a reference trihedron tied to a structure on which the star tracker is mounted, by a device according to claim 1, the method comprising:
    communicating with the star tracker to trigger and recover a measurement of position of the functional trihedron of the star tracker in a trihedron tied to the device,
    communicating with the optical measurement instrument to trigger and recover the measurement of position of the trihedron tied to the device in the reference trihedron; and
    determining by calculation the position of the functional trihedron in the reference trihedron.

12. The method of positioning according to claim 11, wherein the set of optical markers of the optical simulator comprises a set of luminous signals measurable by the star tracker, and
    the method further comprising activating the optical simulator of the device, carried out before communicating with the star tracker.

13. The method of positioning according to claim 11, wherein the measurement of position of the functional trihedron of the star tracker in the trihedron tied to the device, or of the trihedron tied to the device in the reference trihedron, is repeated several times; and determining the position of the functional trihedron in the reference trihedron comprises calculating a mean of the position measurements.

14. The method of positioning according to claim 11, comprising a prior step of fixing the star tracker on the structure and/or fixing the device on the star tracker.

* * * * *